Dec. 4, 1956    R. D. ENGLERT ET AL    2,773,095
PRODUCTION OF DIBASIC ACIDS
Filed Nov. 1, 1952
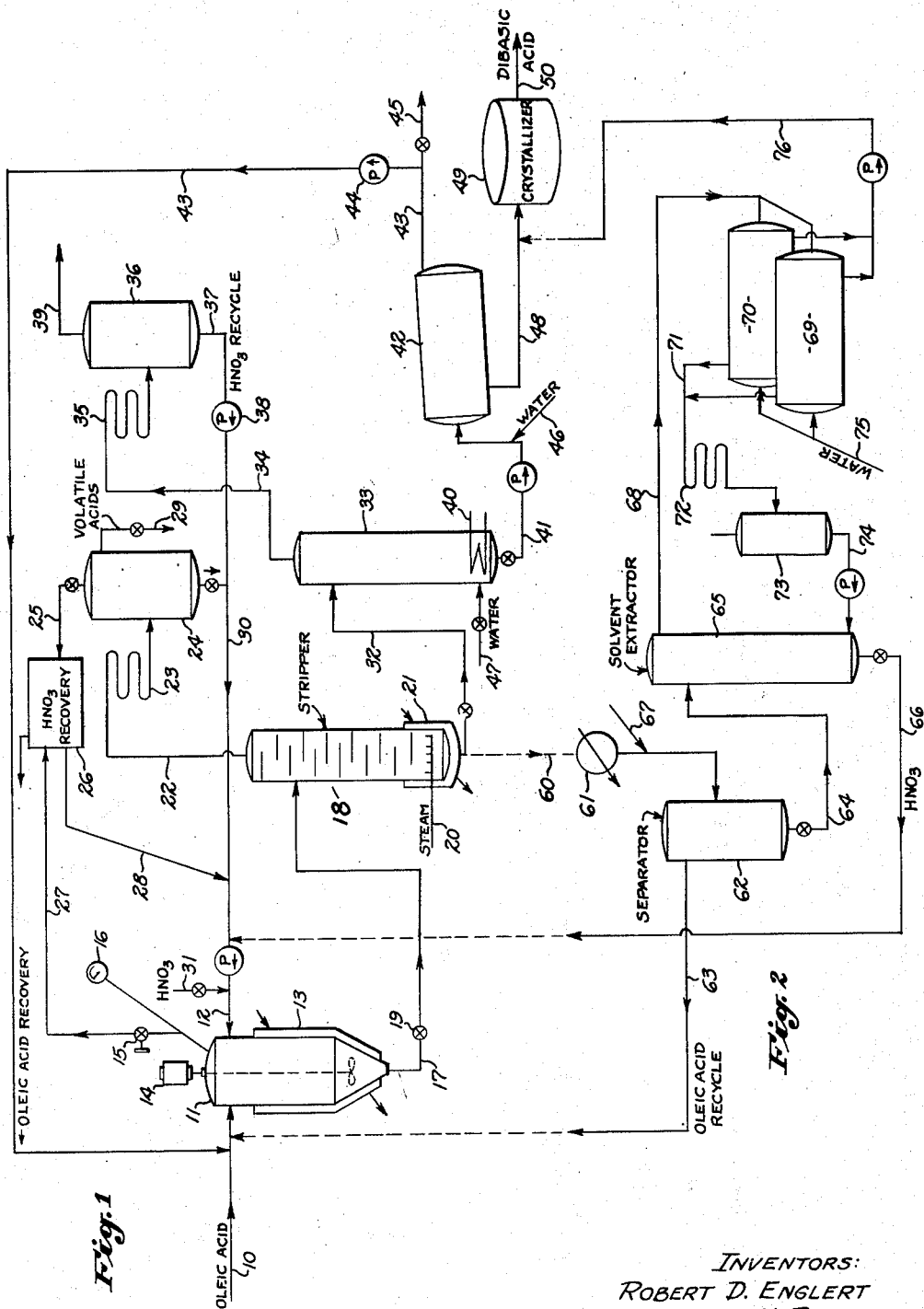
INVENTORS:
ROBERT D. ENGLERT
LAWRENCE M. RICHARDS
By Vanderveer Voorhees, Atty.

United States Patent Office

2,773,095
Patented Dec. 4, 1956

2,773,095
PRODUCTION OF DIBASIC ACIDS

Robert D. Englert, Menlo Park, and Lawrence M. Richards, Los Altos, Calif., assignors to Tallow Research, Inc., San Francisco, Calif., a corporation of California Application November 1, 1952, Serial No. 318,252

12 Claims. (Cl. 260—537)

This invention relates to a process of making organic acids, particularly monobasic and dibasic acids of the aliphatic series. Still more particularly, the invention relates to the manufacture of azelaic and pelargonic acids by oxidation of oleic, linoleic and similar unsaturated fatty acids by a process of oxidative cleavage.

One object of the invention is to effect the oxidation of unsaturated fatty acids with nitric acid in a way to reduce the amount of nitric acid required and reduce the loss of nitric acid resulting from conversion to nitrogen gas. Another object is to avoid the use of concentrated nitric acid requiring expensive equipment to resist attack. Still another object of the invention is to improve the conversion to useful products and reduce the loss to carbon dioxide. Yet a further object is to increase the rate of conversion to useful products, thus reducing the reaction time.

Our invention is illustrated by a drawing which shows in Figure 1 a diagram of a plant for continuously converting oleic acid to monobasic and dibasic acids of lower molecular weights. Figure 2 is a modified form of part of the plant shown in Figure 1.

Heretofore, fats and fatty acids such as oleic, ricinoleic, hydroxystearic, linoleic and stearic acids have been converted by oxidation to acids of lower molecular weight, both monobasic and dibasic, employing various oxidizing agents for the purpose. Typical oxidizing agent were chromic acid, nitric acid, air, ozone, potassium permanganate, etc., but these generally have been not satisfactory because of undesirable by-products. In order to obtain reasonably good yields with nitric acid it has been necessary to use concentrated acid, generally above 60–70%, and much acid was lost in the form of nitrogen oxides and free nitrogen gas. Excessive oxidation has also resulted in production of large amounts of $CO_2$ and other undesired products.

The saturated fatty acids are more difficult to oxidize and the yields of the desired lower molecular weight acids, particularly the dibasic acids, have been poor. The unsaturated acids commonly undergo cleavage at the point of unsaturation, except with certain reagents such as ozone and fused KOH, which shift the unsaturated bond. Oxidation results in both monobasic and dibasic acids, oleic acid giving pelargonic and azelaic acids by the following reaction:

$$CH_3-C_6H_{14}-CH=\!\!=\!\!CH-C_7H_{14}-CO_2H$$

$$\downarrow$$

$$CH_3-C_7H_{14}-CO_2H\ +\ CO_2H-C_7H_{14}-CO_2H$$

Pelargonic acid       Azelaic acid

We have now discovered that oleic acid and other unsaturated fatty acids of 14, 16, and 18 carbon atoms can be cleaved to lower molecular weight acids by oxidation with nitric acid of relatively low concentration if pressure is employed to prevent escape of the nitrogen oxides evolved in the reaction, particularly nitric oxide, NO. We have also found that the time of reaction can be greatly reduced under these conditions without seriously affecting the conversion of oleic acid, and with considerable increase in overall yield. Increase in reaction temperature accompanies pressure and we prefer to operate at temperatures in the range of about 125 to 200° C., depending on acid concentration and reaction time.

We have also discovered that we can convert unsaturated fatty acids in our process without the use of catalysts such as those used in the prior art. Furthermore, in our process the rate of reaction is more readily controlled and there is substantially no danger of the reaction becoming explosively violent.

Heretofore, in the conversion of oleic acid and similar unsaturated acids by oxidation with nitric acid, it has frequently been the practice to react the acid with sulfuric acid, hydrogen peroxide or other agent before treating with nitric acid, as otherwise the yields of useful products were uneconomically low. By our process of oxidation under pressure no preliminary treatment is necessary to obtain satisfactory yields of monobasic and dibasic acids.

More specifically, the fatty acid and nitric acid are heated in an enclosed container for a specified time at a temperature above that which can be obtained at atmospheric pressure. Dilute solutions of nitric acid can be used at the higher temperatures to give satisfactory rates of conversion to monobasic and dibasic acids. The course of the reaction is largely controlled by the temperature and the reaction time for each dilution of nitric acid used, thus controlling the amount of fatty acid oxidized to $CO_2$ and to monobasic and dibasic acids. The residue fatty acid contains combined nitrogen as a result of partial oxidation or addition of nitric acid or nitrogen oxides to the unsaturated bonds and it can be recycled to the oxidation reaction for further conversion into the desired products.

The reaction products can be separated in the following manner: Excess nitric acid is neutralized with alkali solution, e. g.: NaOH solution, then the mixture is made slightly acid and steam distilled to remove monobasic acids. Unreacted fatty acid oil is separated and the dibasic acids are extracted from thet water layer with a suitable solvent such as ethyl acetate. Another method is to steam distill the monobasic acids from the nitric acid reaction mixture without neutralization. Nitric acid and water are then removed by vacuum distillation and the desired dibasic acids are extracted from the residue with hot water in which they are very soluble. On cooling the aqueous solution, the dibasic acids crystallize out owing to their relatively low solubility in cold water.

We have designed a process applying our invention to the commercial production of azelaic acid and volatile monobasic acids. Referring to the drawing, the fatty acid feed stock, preferably oleic acid, is charged by line 10 to reactor 11 where it is vigorously agitated with nitric acid introduced by line 12. Instead of oleic acid we may charge other unsaturated fatty acids such as linoleic, linolenic, palmitoleic, etc. In general, commercial oleic acid known as "red oil" is satisfactory. This material may contain about 75% oleic acid, 15% stearic and the remainder, other unsaturated acids. The composition of "red oil" varies considerably, and it can be purified to increase the oleic acid content, for example, to 90%.

The temperature of reactor 11 is controlled by means of heating or cooling jacket 13 and agitation is provided by agitator 14. The concentration of the nitric acid employed is usually in the range of about 10 to 50 percent, although acid as weak as 5 percent can be used if sufficient time and/or temperature is provided for the reaction. In general, the time of reaction is about 15 minutes to 2 hours.

Gases evolved during the reaction, mainly nitrogen oxides and nitrogen, are retained within the reactor unless the pressure becomes excessive, in which case they are allowed to escape through pressure control valve 15. The pressure in the reactor is indicated on pressure gage 16.

Reaction products are withdrawn continuously or intermittently by line 17 leading to stripping tower 18, the pressure being reduced at valve 19. Stripper 18 is usually operated at atmospheric pressure, heat being supplied by injection of steam at 20 and/or by heating jacket 21. From the top of stripper 18, steam and vapors of volatile monobasic acids are withdrawn by line 22 leading to condenser 23 and receiver 24. Any gases not condensed in 23 are led by line 25 to nitric acid recovery system 26. Here nitric oxide is absorbed in nitric acid, either freshly supplied or withdrawn from another part of the process, sufficient air or oxygen being supplied to effect conversion of the oxides to nitric acid. Catalysts for nitric acid recovery can be employed in the manner well known in the art. Nitrogen oxides from reactor 11 may also be conducted by line 27 to the nitric acid recovery system. Recovered acid from 26 is conducted by line 28 back to the reactor 11.

In receiver 24, the volatile acids are separated from water and dilute nitric acid by settling in the case of acids which are relatively water insoluble. Where it is desired to recover acids which are relatively water soluble, we may employ solvent extraction for the purpose. When the feed stock charged to the process is comprised largely of oleic acid, the principal monobasic acid produced is pelargonic acid.

The product is withdrawn from the upper layer by line 29 and can be purified by redistillation, recrystallization, etc. Recovered dilute nitric acid from the lower layer may be withdrawn from receiver 24 by line 30 and recycled to the reactor 11 if desired. Fresh nitric acid is added to the system by line 31 in sufficient amount to make up for losses. Dilute recycle acid in line 30 may be reconcentrated particularly when operating the reactor with acid concentrations upwards of 30 or 40 percent. When operating with acids of low concentration, e. g., 5 to 25 percent, reconcentration of recycle acid is often unnecessary when the makeup acid applied by line 31 is of sufficiently high concentration, for example, 70 percent.

From the base of stripping tower 18 unreacted nitric acid and nonvolatile organic acids are withdrawn by line 32 leading to vacuum still 33. Vapors of nitric acid are removed by line 34 leading to condenser 35 and receiver 36. Recovered nitric acid of approximately 70 percent concentration is recycled by line 37 and pump 38 while uncondensed vapors are withdrawn to a suitable vacuum pump or ejector by line 39.

Heat for vacuum still 33 is supplied by coil 40 or other suitable means and it is desirable to maintain the temperature in still 33 sufficiently low to avoid any substantial oxidation therewithin. A temperature within the range of about 100 to 150° F. is satisfactory. Removal of nitric acid from the products can be carried out continuously or intermittently and after the nitric acid is eliminated the products are transferred by line 41 to separator 42 where the unreacted fatty acid is separated, either as an upper layer or lower layer, depending on the specific gravity of the unconverted "red oil." In some cases, the presence of partially nitrated products increases the density of the unconverted oil to a point where it forms a bottom layer. For simplicity we have shown the separation of the unconverted oil as an upper layer which is withdrawn by line 43 and pump 44 to be recycled back to the reactor 11. From time to time it is often desirable to purge the system of the unconverted oils whereupon they are withdrawn by valved line 45. They can be treated to remove saturated fatty acids difficult to oxidize and then returned to the process.

Inasmuch as the non-volatile, principally dibasic, acids are soluble in hot water, it is desirable to introduce water by line 46 to assist the separation of these acids from the unconverted oil. Water can also be introduced from time to time into vacuum still 33 by line 47 to dissolve dibasic acids which may otherwise tend to accumulate in the still.

From separator 42 the dibasic acids are withdrawn by line 48 leading to evaporator or crystallizer 49 where water is removed or where the acids are crystallized from solution on cooling. The crude acid product is withdrawn at 50 by means of a conveyor or other device.

Referring now to Figure 2 which shows an alternative method of recovering dibasic acid from the oxidation products, the products which have been stripped free of volatile acids are withdrawn from the base of stripper 18 by line 60, cooled in 61 and separated in separator 62. Unconverted oleic acid is removed as a layer and is recycled by line 63. Dibasic acid in solution in excess nitric acid is withdrawn by line 64 to extraction tower 65. In tower 65 the dibasic acids are dissolved in a suitable solvent immiscible with nitric acid which is removed at the bottom of the tower by line 66 and recycled to reactor 11. Solvents suitable for our purpose are nitrobenzene, methyl n. butyl ketone and nitrobutane. If the nitric acid concentration is less than about 40 percent we may employ ethyl acetate as the solvent. The concentration of the nitric acid can be controlled by introducing additional water at 67.

From extraction tower 65 the fat solution is withdrawn by line 68 leading to evaporators 69 and 70 from which the solvent vapors are withdrawn by vapor line 71 leading to condenser 72 and receiver 73 from which the recovered solvent is recycled by line 74. Evaporators 69 and 70 may be charged alternately and the acids deposited therein may be flushed out by hot water introduced by manifold 75. The hot aqueous solution of dibasic acid passes by line 76 to crystallizer 49 or other suitable recovery system.

The apparatus employed in our process may be of stainless steel for acid concentrations of 50% $HNO_3$ and below. Alloy steels corresponding to formula No. 309–Cb, No. 316 and No. 347 can be used. For acid of concentrations above 50% we can use glass-lined steel and aluminum. Where pressures are low, glass and ceramic pipes and vessels are satisfactory.

Gases vented from the reactor 11 by valve 15 are preferably cooled before venting to condense out volatile acids, nitric acid, etc. The condensate is returned to the reactor or the volatile acids may be trapped off and withdrawn from the system if desired.

The pressure employed in the reactor 11 is suitably only that resulting from the reaction, i.e., the autogenous pressure. In continuous operation the pressure builds up to a point where it is desirable to vent a part of the gas from the reactor and hold the pressure constant. Pressures in the range of 50 to 500 p. s. i. gauge are preferred for most purposes and we may employ pressures of 10 p. s. i. gage upwards with good results.

The following examples give the results obtained when operating in a closed vessel under autogenous pressure, agitation being provided by shaking. The percent conversion is based on material charged and the yield is based on fatty acid consumed in the reaction. After charging the vessel, it was flushed with nitrogen to facilitate gas analysis, and the gaseous products of the reaction were analysed as well as the liquids.

*Effect of catalyst*

A previous study of the oxidation of oleic acid with nitric acid at atmospheric pressure showed that no satisfactory conversion was obtained without a catalyst. Suitable catalysts were vanadium, copper, manganese and chromium. Cobalt was of little value. The following three experiments show that when operating under pressure at 135° C. the catalyst is of no value.

*Example 1.*—Exactly 21.2 g. of oleic acid (containing 77% monoene and 9% diene) were treated with 504 ml. of 18% nitric acid at 135° C. for one hour. The products were: 9.6 g. of crude dibasic acids, 3.2 g. of monobasic acids, and 4.5 g. of unconverted residue. The neutral equivalents (N.E.) were 94, 150, and 240, respectively. This is a 67% conversion and an 84% yield of dibasic acids. Eight percent of the starting material was oxidized to carbon dioxide and carbon monoxide.

*Example 2.*—The bomb was coated with silicone grease to eliminate any catalytic effect of the walls and the reaction was carried out as in Example 1. The products were: 9.2 g. of dibasic acids (N.E.=96), 3.6 g. of monobasic acids (N.E.=149), and 5.1 g. of residue (N.E.= 251.) This is a 64% conversion and an 82% yield of dibasic acids. Nine percent of the starting material was oxidized to gases.

*Example 3.*—The reaction described in Example 1 was carried out again with the addition of 0.414 g. of $Cr(NO_3)_3 \cdot 9H_2O$ as a catalyst. The products were: 9.2 g. dibasic acids, 1.9 g. monobasic acids, and 5.5 g. residue. This is a 65% conversion and an 84% yield of dibasic acids. Nine percent of the starting material was oxidized to gases.

*Effect of pressure*

The following examples show that reaction under autogenous pressures gives higher conversions than reaction at atmospheric pressure even when comparable temperatures can be attained. They also give added proof that a catalytic substance such as a chromium salt is not beneficial.

*Example 4.*—The reaction was carried out with 21.2 g. of oleic acid and 252 ml. of 34% nitric acid for one hour at 110° C. A 45% conversion to dibasic acids was obtained.

*Example 5.*—The above reaction was simulated by reaction at atmospheric pressure. Since the refluxing materials only attained 107° C. the reaction time was increased to 70 minutes. A 35% conversion to dibasic acids was obtained.

*Example 6.*—The reaction in Example 5 was duplicated with the addition of 0.414 g. $Cr(NO_3)_3 \cdot 9H_2O$. A 29% conversion to dibasic acids was obtained.

*Example 7.*—When the reaction of Example 4 was repeated at 135° C. and 15 minutes, the conversion rose to 67% and yield to 86% dibasic acids.

*Acid concentration*

The following examples illustrate the effect of various dilutions of nitric acid. The time of reaction and/or the temperatures of reaction should be lowered as more concentrated solutions of nitric acid are used to obtain proper direction of reaction along with high conversions to desired materials.

*Example 8.*—Oxidation of 10.6 g. of oleic acid with 504 ml. of 5% nitric acid for 15 minutes at 170° C. gave 4.2 g. of dibasic acids (60% conversion and 69% yield), 1.5 g. of monobasic acids, and 1.7 g. of residue. Twelve percent of the starting material was oxidized to gases.

*Example 9.*—Oxidation of 21.2 g. of oleic acid with 504 ml. of 10% nitric acid for 90 minutes at 135° C. gave 5.9 g. of dibasic acids (42% conversion and 68% yield), 3.1 g. of monobasic acids, and 9.6 g. of residue. Six percent of the starting material was oxidized to gases.

*Example 10.*—The above reaction was repeated except the conditions were 15 minutes at 165° C. The products were: 9.1 g. of dibasic acids (64% conversion and 79% yield), 2.2 g. of monobasic acids, and 4.4 g. of residue. Twelve percent of the starting material was oxidized to gases.

*Example 11.*—A reaction between 21.2 g. of oleic acid (containing 90% monoene and 3% diene) and 504 ml. of 18% nitric acid for 30 minutes at 125° C. gave 4.6 g. of dibasic acids, 2.4 g. of monobasic acids, and 12.3 g. of residue. Two percent of the starting material was oxidized to gases. Conversion to dibasic acids was 33% and yield 67%.

*Example 12.*—The above reaction was repeated except at 135° C. for 30 minutes. A 50% conversion and a 75% yield of dibasic acids were obtained with five percent of the starting material being oxidized to gases.

*Example 13.*—Oxidation of 21.2 g. of oleic acid (70% monoene) with 504 ml. of 18% nitric acid for 15 minutes at 150° C. gave 9.3 g. of dibasic acids (66% conversion and 84% yield), 2.1 g. of pelargonic acid, and 5.2 g. of residue. Eleven percent of the starting material was oxidized to gases.

*Example 14.*—The following data show the high rate of reaction which can be obtained with concentrated acid at elevated temperature and pressure. The small amount of residue from the reaction indicates that still better results can be obtained at shorter reaction times. Oleic acid (1.2 ml.) and concentrated (70%) nitric acid (5.0 ml.) were placed in a tube which was sealed and enclosed in the rocking autoclave with 250 ml. of water as a heat transfer agent and glass wool to protect the tube. It took 18 minutes to reach 125° C. in the water space and two minutes longer to reach 135° C. The autoclave was removed from the heat source and the tube broke shortly thereafter. After cooling, the contents were removed and extracted with acetone and ether. The solvents and water were evaporated after neutralization with caustic. The material was worked up as usual and 0.5 g. of dibasic acids and 0.07 g. of residue were found. The dibasic acids were semi-solid and had a neutral equivalent of 108.

*Example 15.*—When the unsaturation of the oleic acid raw material was increased from 79% to 93% (77% monoene, 9% diene to 90% monoene, 3% diene) the conversion increased from 60% to 72% and the yield from 84% to 94% dibasic acids. Conversion conditions were 18% nitric acid for one hour at 135° C.

We have described our invention with respect to specific examples and apparatus, but we intend that the scope thereof be determined by the following claims:

We claim:

1. The process of making dibasic acids by cleaving unsaturated fatty acids of about 14 to 18 carbon atoms which comprises subjecting them to the action of an oxidizing agent consisting of dilute nitric acid at a temperature of about 125–200° C. and pressure of about 10–500 p. s. i. gage and thereafter isolating dibasic acids from the reaction products.

2. The process of claim 1 wherein the concentration of the nitric acid employed is about 5 to 50 percent.

3. The process of claim 1 wherein the pressure is about 50 to 500 pounds per square inch, generated by the gas evolved by the oxidation reaction.

4. The process of making azelaic acid which consists of intimately mixing oleic acid and dilute nitric acid, maintaining the mixture under pressure of about 50 to 500 p. s. i. gage while heating to a temperature upwards of about 125° C., and thereafter cooling the reaction mixture and recovering the azelaic acid from the product.

5. The process of claim 4 wherein the azelaic acid is recovered by extraction with a selective solvent selected from the class consisting of nitrobenzene, methyl n-butyl ketone, nitrobutane, ethyl acetate, acetone and ether.

6. The process of making dibasic organic acids from unsaturated fatty acids of 14 to 18 carbon atoms which consists of mixing said fatty acids with dilute nitric acid in a reaction zone, controlling the temperature of said reaction zone within the range of about 125 to 200° C., retaining oxides of nitrogen from the reaction in contact with reaction mixture under superatmospheric pressure of about 10 to 500 p. s. i. gage, withdrawing conversion products from said reaction zone, separating unconverted higher molecular weight acid, separating excess nitric acid and recovering dibasic acids as the principal product of the process.

7. The process of claim 6 wherein the excess nitric acid is separated by distillation under vacuum and the recovered acid is recycled to the reaction zone.

8. The process of claim 6 wherein monobasic acids are distilled from the reaction products by stripping with steam.

9. The process of claim 8 wherein unconverted higher molecular weight acids are allowed to separate by settling from the reaction products after removal of the said monobasic acids and are recycled to the reaction zone for further conversion.

10. The process of making aliphatic monobasic and dibasic acids which consists of mixing an unsaturated fatty acid having 14 to 18 carbon atoms with dilute nitric acid in a reaction zone maintained at a pressure of about 10 to 500 p. s. i. gage, controlling the temperature of said reaction zone within the range of about 125 to 200° C., thereby effecting oxidation and cleavage of said fatty acid, withdrawing the reaction products to stripping zones wherein volatile monobasic acids are removed, vacuum distilling excess nitric acid from said reaction products at a temperature below that required for oxidation of dibasic acids, separating unconverted fatty acid from said reaction products and recovering dibasic acid from the reaction products as a principal product of the process.

11. The process of claim 10 wherein nitrogen oxides evolved from said reaction mixture are retained in said reaction zone under pressure in contact with fatty acids therein.

12. The process of claim 11 wherein a portion of said nitrogen oxides are withdrawn from said reaction zone at a pressure within the range of about 50 to 500 p. s. i., and said withdrawn nitrogen oxides are converted to nitric acid which is returned to said reaction zone.

References Cited in the file of this patent

UNITED STATES PATENTS

| 2,203,680 | Ellingboe | June 11, 1940 |
| 2,292,950 | Loder et al. | Aug. 11, 1942 |
| 2,298,387 | Kenyon et al. | Oct. 13, 1942 |
| 2,365,290 | Price et al. | Dec. 19, 1944 |
| 2,450,858 | Fitzpatrick et al. | Oct. 5, 1948 |
| 2,662,908 | Logan | Dec. 15, 1953 |

OTHER REFERENCES

Tilley: Liebig's Ann., vol. 39, page 166 (1840–1844).
Sacc Liebig's Ann., vol. 51, pgs. 221–229 (1844).
Wirz Liebig's Ann., vol. 104, page 271 (1857).
Arppe Liebig's Ann., vol. 120, page 288 (1861).
Brighton: Chem. Abstracts, vol. 12, page 98 (1917).
Day et al.: J. Chem. Soc. (London), vol. 117, page 641 (1920).
Arppe: Beilstein (Handbuch, 4th ed.), vol. 2, page 692 (1920).
Kiliani: Ber. Deut. Chem., vol. 54, pg. 463 (1921).
Carmichael: J. Chem. Soc. (London), vol. 121, pgs. 2546–7 (1922).
Derx: Rec. Trav. Chem. des Pay-Bas, vol. 141, page 338 (1922).